(12) United States Patent
Takashima et al.

(10) Patent No.: US 11,136,643 B2
(45) Date of Patent: Oct. 5, 2021

(54) HIGH-STRENGTH STEEL SHEET AND METHOD FOR PRODUCING SAME

(71) Applicant: JFE STEEL CORPORATION, Tokyo (JP)

(72) Inventors: Katsutoshi Takashima, Tokyo (JP); Koichi Taniguchi, Tokyo (JP); Takashi Kobayashi, Tokyo (JP); Hiroshi Matsuda, Tokyo (JP); Rinsei Ikeda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 283 days.

(21) Appl. No.: 16/320,864

(22) PCT Filed: Aug. 10, 2017

(86) PCT No.: PCT/JP2017/029034
§ 371 (c)(1),
(2) Date: Jan. 25, 2019

(87) PCT Pub. No.: WO2018/030500
PCT Pub. Date: Feb. 15, 2018

(65) Prior Publication Data
US 2019/0161822 A1 May 30, 2019

(30) Foreign Application Priority Data

Aug. 10, 2016 (JP) .............................. JP2016-157759

(51) Int. Cl.

| | | |
|---|---|---|
| *C21D 9/46* | (2006.01) |
| *C21D 8/02* | (2006.01) |
| *C22C 38/38* | (2006.01) |
| *C22C 38/12* | (2006.01) |
| *C22C 38/08* | (2006.01) |
| *C22C 38/22* | (2006.01) |
| *C22C 38/00* | (2006.01) |
| *C22C 38/26* | (2006.01) |
| *C22C 38/24* | (2006.01) |
| *C22C 38/28* | (2006.01) |
| *C22C 38/14* | (2006.01) |
| *C22C 38/32* | (2006.01) |
| *C22C 38/06* | (2006.01) |
| *C22C 38/04* | (2006.01) |
| *C22C 38/02* | (2006.01) |
| *C23C 2/02* | (2006.01) |
| *C23C 2/06* | (2006.01) |
| *C23C 2/28* | (2006.01) |
| *C21D 6/00* | (2006.01) |

(Continued)

(52) U.S. Cl.
CPC .................. *C21D 9/46* (2013.01); *C21D 1/30* (2013.01); *C21D 6/001* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0263* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C23C 2/02* (2013.01); *C23C 2/06* (2013.01); *C23C 2/28* (2013.01); *C21D 2211/001* (2013.01); *C21D 2211/002* (2013.01); *C21D 2211/005* (2013.01); *C21D 2211/008* (2013.01); *Y02P 10/20* (2015.11)

(58) Field of Classification Search
None
See application file for complete search history.

(56) References Cited

U.S. PATENT DOCUMENTS 8,951,366 B2   2/2015 Sano et al.
10,174,396 B2  1/2019 Takashima et al.
(Continued)

FOREIGN PATENT DOCUMENTS

EP    2767604 A1   8/2014
EP    2803748 A1   11/2014
(Continued)

OTHER PUBLICATIONS

Mar. 23, 2021 Office Action issued in U.S. Appl. No. 16/202,634.
(Continued)

*Primary Examiner* — Anthony M Liang
(74) *Attorney, Agent, or Firm* — Oliff PLC

(57) ABSTRACT

A high-strength steel sheet having a specified chemical composition and a method for producing the same. The steel sheet including a multi-phase structure including, by volume fraction, ferrite of 35% to 65%, residual austenite of 7% or less (including 0%), martensite of 20% to 60%, bainite of 20% or less (including 0%), the ferrite having an average crystal grain size of 8 μm or less and an average aspect ratio of 3.5 or less, the martensite having an average crystal grain size of 3 μm or less, and the bainite having an average crystal grain size of 3 μm or less when contained. A standard deviation of Vickers hardness of the steel sheet being 30 or less when measured at 200 μm intervals from a position of 100 μm from a surface to a central portion in a thickness direction of the sheet.

13 Claims, No Drawings

(51) Int. Cl.
*C21D 1/30* (2006.01)
*C22C 38/20* (2006.01)
*C22C 38/58* (2006.01)

(56) References Cited

U.S. PATENT DOCUMENTS

| | | |
|---|---|---|
| 2010/0132849 A1 | 6/2010 | Takagi et al. |
| 2011/0008647 A1 | 1/2011 | Azuma et al. |
| 2013/0167980 A1 | 7/2013 | Kawata et al. |
| 2016/0177427 A1* | 6/2016 | Takashima ............ C21D 8/0236 148/603 |
| 2016/0312329 A1 | 10/2016 | Hasegawa et al. |
| 2017/0137906 A1 | 5/2017 | Fan et al. |
| 2017/0152580 A1 | 6/2017 | Kimura et al. |
| 2019/0161822 A1 | 5/2019 | Takashima et al. |

FOREIGN PATENT DOCUMENTS

| | | |
|---|---|---|
| EP | 3012339 A1 | 4/2016 |
| EP | 3054025 A1 | 8/2016 |
| GN | 103857817 A | 6/2014 |
| GN | 105814227 A | 7/2016 |
| JP | 3758515 B2 | 3/2006 |
| JP | 3823338 B2 | 9/2006 |
| JP | 2009-144225 A | 7/2009 |
| JP | 2011-111670 A | 6/2011 |
| JP | 2011-132602 A | 7/2011 |
| JP | 4925611 B2 | 5/2012 |
| JP | 5884210 B1 | 3/2016 |
| WO | 2009/119751 A1 | 10/2009 |
| WO | 2012/036269 A1 | 3/2012 |
| WO | 2015/019557 A1 | 2/2015 |
| WO | 2015/092982 A1 | 6/2015 |
| WO | 2015/185975 A1 | 12/2015 |

OTHER PUBLICATIONS

Sep. 29, 2020 Office Action issued in U.S. Appl. No. 16/202,634.
Sep. 4, 2020 Office Action issued in Chinese Patent Application No. 201780046271.2.
Nov. 14, 2017 International Search Report issued in International Application No. PCT/JP2017/029034.
Apr. 4, 2019 Extended Search Report issued in European Patent Application No. 17839567.9.
Feb. 5, 2021 Office Action issued in Chinese Patent Application No. 201780046271.2.
May 20, 2020 Office Action issued in Chinese Patent Application No. 201780046271.2.
Jun. 30, 2021 Office Action issued in Chinese Patent Application No. 201780046271.2.
Jun. 29, 2021 Office Action issued in U.S. Appl. No. 16/488,301.

* cited by examiner

HIGH-STRENGTH STEEL SHEET AND METHOD FOR PRODUCING SAME

TECHNICAL FIELD

This application relates to a high-strength steel sheet and a method for producing the same.

BACKGROUND

In recent years, stricter regulations are imposed on $CO_2$ emissions in view of increasing environmental problems, and automotive industry is faced with challenges to reduce weight of an automotive body to improve fuel economy. In this regard, thinning wall thickness of automotive parts by application of high-strength steel sheet thereto is promoted, and application of steel sheets with tensile strength (TS) of 980 MPa or more is promoted. However, the high-strength steel sheet used for structural members and reinforcing members of vehicles is required to have excellent formability. Particularly, molding parts having complicated shapes requires not only each of characteristics such as elongation, hole expandability, and bendability to be excellent, but also these to be excellent as a whole. Press-molded parts are often combined by resistance welding (spot welding). However, when spot welding is performed, zinc on a surface of a steel sheet melts and residual stress is generated in the vicinity of the welded part, thus raising a concern that liquid metal brittleness occurs and cracks occur in the steel sheet in the case of high-strength steel. Even when the high-strength steel sheet is a non-galvanized steel sheet, if it is welded with another steel sheet that is a galvanized steel sheet, the zinc will melt and thus the non-galvanized steel sheets will also be involved with the problem. Therefore, to apply the high-strength steel sheet, excellent workability (elongation, hole expandability, and bendability) and crack-resistant characteristic in resistance welding are required.

In related arts, there are reports on improving workability and crack-resistant characteristic against resistance welding of a high-strength steel sheet having TS of 980 MPa or more. For example, Patent Literature 1 discloses a DP steel sheet (dual-phase steel sheet) that is excellent in elongation and bendability by controlling the crystal grain size, volume fraction and nano-hardness of ferrite. Patent Literature 2 discloses a technique for improving surface cracks during resistance welding by controlling the amounts of Si, Al, and Mn added.

CITATION LIST

Patent Literature

PTL 1: Japanese Patent No. 4925611
PTL 2: Japanese Patent No. 3758515

SUMMARY

Technical Problem

While Patent Literature 1 provides strength of 980 MPa or more, the steel sheet has insufficient elongation, and workability is also not fully satisfactory. With Patent Literature 2, it is difficult to achieve high strength of 980 MPa or more, and strength and workability are not fully ensured.

As described above, it is difficult to improve both workability and crack-resistant characteristic against resistance welding in a high-strength steel sheet of 980 MPa or more, and in real, steel sheets that have these characteristics at the same time have not been developed even in other types of steel sheets.

The disclosed embodiments have been made in view of such problems, and an object thereof is to provide a high-strength steel sheet and a method for producing the same, in which the steel sheet has high tensile strength, high elongation, hole expandability, and bendability, as well as an excellent crack-resistant characteristic against resistance welding such that cracks do not occur even during resistance welding. Specifically, it is an object of the disclosed embodiments to provide a high-strength steel sheet having tensile strength of 980 MPa or more, an elongation of 16.5% or more, a hole expansion ratio of 35% or more and a bendability (R/t) of 1.5 or less in a direction perpendicular to a rolling direction (where, R is the tip radius of the V block and t is the sheet thickness) and having crack-resistant characteristic against resistance welding such that cracks do not occur even during resistance welding with an electrode angled with respect to the steel sheet, and a method for producing the same.

The steel sheet of the disclosed embodiments is a steel sheet having a sheet thickness of 0.4 mm or more and 2.4 mm or less.

The high-strength steel sheet according to the disclosed embodiments includes a high-strength plated steel sheet having a plated layer on its surface. The plated layer includes an alloying plated layer.

Solution to Problem

As a result of extensive investigations, the inventors found that workability and crack-resistant characteristic against resistance welding can be improved by adjusting the volume fraction of ferrite and the like in a steel sheet structure (multi-phase structure of a steel sheet) at a specific ratio, and that excellent elongation, hole expandability, bendability and crack-resistant characteristic against resistance welding can be obtained in a high-strength steel sheet by decreasing the average crystal grain size of ferrite and the like and controlling the hardness distribution in the thickness direction of the steel sheet. The disclosed embodiments are based on the above findings.

Since Mn can secure hardenability at low cost, it is added for increasing strength, but in the case of producing a steel sheet by continuous casting, Mn segregates in the steel sheet in a band form in parallel with the rolled surface. The presence of this Mn band makes it easier to generate a second phase in the Mn band during annealing, and the second phase is generated along the Mn band also in the final sheet structure. When this micro segregation is present, voids are continuously generated at the location where the micro segregation is present, during punching in the hole expansion test, and the hole expandability is degraded. Furthermore, since this Mn bands are also easily formed on the surface of the steel sheet, a difference in micro hardness occurs in bending, and cracks are generated. Thus, the bendability is also degraded. Therefore, it is necessary to reduce the Mn band as much as possible.

As for cracks due to liquid metal brittleness at resistance welding, Zn dissolved during welding and internal stress generated, cause cracks at the heat affected zone (HAZ) in the vicinity of the nuggets. The cracks may occur even within a proper current range where sputtering does not occur, if tensile strength reaches such high strength as 980 MPa class. Particularly when the welding electrode is used at an angle to the steel sheet, the internal stress increases and cracks are generated. Once the cracks occur, there is a concern that the fatigue strength of the welded portion is particularly reduced, so it is necessary to avoid these cracks in the case of use in automobiles or the like. Observation of the cracks revealed that the grain boundary fracture occurred at the site of the martensite single-phase region after welding in the heat affected zone (HAZ).

As a result of extensive investigations, the inventors found that it is possible to minimize the creation of Mn bands by controlling an amount of Mn that is effective in increasing high strength and controlling the conditions of hot rolling and cold rolling, thereby improving the workability, and that it is possible to improve the liquid metal embrittlement susceptibility by adjusting the micro hardness distribution during resistance welding. That is, the disclosed embodiments provide [1] to [7] described below.

[1] A high-strength steel sheet having a steel sheet including a composition containing, in mass %, C: 0.05 to 0.15%, Si: 1.6% or less, Mn: 1.3 to 2.4%, P: 0.05% or less, S: 0.0050% or less, Al: 0.01 to 0.10%, N: 0.010% or less, Ti: 0.005 to 0.10%, B: 0.0002 to 0.004%, and one or two selected from Mo: 0.005 to 0.50% and Cr: 0.005 to 1.0%, the balance being Fe and unavoidable impurities, wherein the steel sheet includes: a multi-phase structure containing, in volume fraction, ferrite of 35% to 65%, residual austenite of 7% or less (including 0%), martensite of 20% to 60%, bainite of 20% or less (including 0%), the ferrite having an average crystal grain size of 8 μm or less and an average aspect ratio of 3.5 or less, the martensite having an average crystal grain size of 3 μm or less, and the bainite having an average crystal grain size of 3 μm or less when contained; and a standard deviation of Vickers hardness of the steel sheet being 30 or less when measured at 200 μm intervals from a position of 100 μm from a surface to a central portion in a thickness direction of the steel sheet.

[2] The high-strength steel sheet according to [1] in which the composition further contains, in mass %, one or more selected from V: 0.05% or less, Nb: 0.50% or less, Cu: 0.30% or less, Ni: 0.05% or less, and Ca and/or REM: 0.0050% or less.

[3] The high-strength steel sheet according to [1] or [2], further having a plated layer on the surface thereof.

[4] The high-strength steel sheet according to [3], in which the plated layer is a hot-dip galvanized layer or a hot-dip galvannealed layer.

[5] A method for producing a high-strength steel sheet, including: a hot rolling step of hot-rolling a steel material having the composition according to [1] or [2] under a condition in which a rolling reduction rate of a final pass of a finish rolling is 12% or more, the rolling reduction rate of the pass before the final pass is 15% or more, a finish rolling starting temperature is 1000° C. to 1150° C., and a finish rolling finishing temperature is 850° C. to 950° C.; a primary cooling step of cooling the hot-rolled steel sheet obtained in the hot rolling step at a first average cooling rate of 75° C./s or higher up to a cooling stop temperature, the cooling stop temperature being 700° C. or lower; a secondary cooling step of cooling the steel sheet obtained in the primary cooling step under a condition of a second average cooling rate of 5° C./s to 50° C./s up to a coiling temperature, and a coiling step of coiling the steel sheet at a coiling temperature of 600° C. or lower; a pickling step of pickling the hot-rolled steel sheet after the coiling step, and a cold rolling step of cold-rolling the pickled steel sheet; and an annealing step of heating the cold-rolled steel sheet obtained in the cold rolling step at an average heating rate of 3° C./s to 30° C./s up to a temperature range of 760° C. to 900° C., holding the steel sheet at soaking temperature in the temperature range of 760° C. to 900° C. for 15 seconds or longer, and then cooling the steel sheet under a condition of an average cooling rate of 3° C./s to 30° C./s up to a cooling stop temperature, the cooling stop temperature being 600° C. or lower.

[6] The method for producing a high-strength steel sheet according to [5], further including a plating step of subjecting the steel sheet obtained in the cooling in the annealing step to plating treatment.

[7] The method for producing a high-strength steel sheet according to [6], in which the plating treatment is a treatment of hot-dip galvanizing and alloying at 450° C. to 600° C.

Advantageous Effects

According to the disclosed embodiments, it is possible to provide a high-strength steel sheet having maximized high tensile strength, high elongation, hole expandability and bendability, and excellent crack-resistant characteristic against resistance welding such that cracks do not occur during resistance welding. Specifically, a high-strength steel sheet with excellent strength, elongation, hole expandability, bendability and crack-resistant characteristic against resistance welding can be obtained, which has tensile strength of 980 MPa or more, an elongation of 16.5% or more, a hole expansion ratio of 35% or more and a bendability (R/t) of 1.5 or less in a direction perpendicular to a rolling direction (where, R is the tip radius of the V block and t is the sheet thickness) and having crack-resistant characteristic against resistance welding such that cracks do not occur even during resistance welding with an electrode angled with respect to the steel sheet.

By "cracks do not occur even during resistance welding with an electrode angled with respect to the steel sheet", it means that cracks of 0.1 mm or more are not observed when evaluated by the evaluation method described in the Examples. This will be described in detail below. One test piece that is cut into 50×150 mm along the longitudinal direction of the test piece, being in the direction perpendicular to the rolling direction of a cold rolled steel sheet, and another piece of a 590 MPa class hot-dip galvanized steel sheet are subjected to resistance welding (spot welding). For a resistance welding machine, a servo motor pressurized type resistance welder of single-phase alternating current (50 Hz) in which the servo motor is attached to a welding gun is used to perform the resistance spot welding with respect to a pair of sheets as a sample in which the two steel sheets were stacked, with the pair of sheets being tilted by 4°. For welding conditions, pressurizing force is 3.8 kN and hold time is 0.2 seconds. The welding current and welding time are adjusted so that the nugget diameter is 5.9 mm. After welding, the sample is cut in half and the cross section is observed with an optical microscope, and when cracks of 0.1 mm or more are not observed, it is confirmed that "cracks do not occur even during resistance welding with an electrode angled with respect to the steel sheet".

According to the disclosed embodiments, in many cases, the tensile strength is 1100 MPa or less, the elongation is 20.0% or less, and the hole expanding ratio is 50% or less. In many cases, R/t is 0.3 or more.

DETAILED DESCRIPTION

Hereinafter, specific embodiments according to the disclosed embodiments will be described. The disclosed embodiments are not limited to the embodiments described below.

A composition of the high-strength steel sheet of the disclosed embodiments includes, in mass %, C: 0.05 to 0.15%, Si: 1.6% or less, Mn: 1.3 to 2.4%, P: 0.05% or less, S: 0.005% or less, Al: 0.01 to 0.10%, N: 0.010% or less, Ti: 0.005 to 0.10%, B: 0.0002 to 0.004%, and one or two selected from Mo: 0.005 to 0.50% and Cr: 0.005 to 1.0%, the balance being Fe and unavoidable impurities.

The composition of the high-strength steel sheet further includes, in mass %, one or more selected from V: 0.05% or less, Nb: 0.50% or less, Cu: 0.30% or less, Ni: 0.05% or less, and Ca and/or REM: 0.0050% or less.

The composition will be described below. In the following description, representing the content of components refers to "mass %".

C: 0.05% to 0.15%

Carbon (C) is an element effective in increasing the strength of the steel sheet and also contributes to the formation of the second phase including bainite, martensite, and residual austenite in the disclosed embodiments. The C content of less than 0.05% causes difficulty in securing the volume fractions of required bainite, martensite, and residual austenite, and therefore, difficulty in securing the strength. Therefore, the C content is 0.05% or more. The C content is preferably 0.06% or more. More preferably, the C content is 0.07% or more, or still more preferably, 0.09% or more. On the other hand, excessive C content increases the hardness after resistance welding, resulting in degraded toughness at resistance welding and degraded crack-resistant characteristic against resistance welding. Accordingly, the C content is 0.15% or less. The C content is preferably 0.14% or less, or more preferably 0.13% or less. Still more preferably, the C content is 0.11% or less.

Si: 1.6% or less

Silicon (Si) is an element effective in solid solution strengthening of ferrite and increasing the strength of the steel sheet. However, an excessive Si content decreases the toughness at resistance welding and degrades crack-resistant characteristic against resistance welding. Therefore, the Si content is 1.6% or less. Preferably, the Si content is 1.5% or less. More preferably, the Si content is 1.4% or less, or still more preferably, 1.3% or less. Most preferably, the Si content is less than 0.8%. While there is no specific lower limit defined, the Si content is preferably 0.005% or more because to achieve an extremely low Si content increases the cost. More preferably, the Si content is 0.01% or more, or still more preferably, 0.05% or more.

Mn: 1.3% to 2.4%

Manganese (Mn) is an element contributing to an increase in strength by facilitating solid-solution strengthening and formation of a second phase. Also, Mn is an element that stabilizes austenite and is an element necessary for controlling the fraction of the second phase. It is necessary to contain 1.3% or more of Mn to obtain the desired effect. Preferably, the Mn content is 1.5% or more. More preferably, the Mn content is 1.6% or more, or still more preferably, 1.8% or more. On the other hand, the excessive Mn content causes excessive generation of the Mn bands, resulting in degraded hole expandability, bendability and crack-resistant characteristic against resistance welding. Therefore, the Mn content is 2.4% or less. Preferably, the Mn content is 2.2% or less. More preferably, the Mn content is 2.1% or less, or still more preferably, 2.0% or less.

P: 0.05% or less

Phosphorus (P) contributes to an increase in strength by solid-solution strengthening, but since an excessive P content causes embrittlement of grain boundaries due to significant segregation in the grain boundaries and decreases crack-resistant characteristic against resistance welding. Therefore, the P content is 0.05% or less. Preferably, the P content is 0.04% or less. More preferably, the P content is 0.02% or less, or still more preferably, 0.01% or less. While there is no particular lower limit defined, it is preferably 0.0005% or more because an extremely low P content increases the steelmaking cost.

S: 0.0050% or less

The high sulfur (S) content causes occurrence of a large amount of sulfide such as MnS, and this is the starting point of voids during punching in a hole expansion test, resulting in degraded hole expandability. Therefore, the upper limit of the S content is 0.0050%. Preferably, it is 0.0045% or less. More preferably, it is 0.0020% or less, or still more preferably, 0.0010% or less. While there is no particular lower limit defined, it is preferably 0.0002% or more, because, as with P, an extremely low S content increases the steelmaking cost.

Al: 0.01% or more and 0.10% or less

Aluminum (Al) is an element necessary for deoxidation, and an Al content necessary to obtain the desired effect is 0.01% or more. Preferably, Al content is 0.02% or more, or more preferably, 0.03% or more. The Al content is 0.10% or less because the effect is saturated at the Al content above 0.10%. Preferably, the Al content is 0.08% or less, or more preferably, 0.06% or less.

N: 0.010% or less

It is necessary to reduce the nitrogen (N) content because N forms a coarse nitride and degrades hole expandability. This effect becomes prominent at the N content exceeding 0.010%, and thus the N content is 0.010% or less. Preferably, the N content is 0.008% or less. More preferably, the N content is 0.006% or less, or still more preferably, 0.004% or less. While there is no particular lower limit defined for the N content, it is preferably 0.0002% or more because an extremely low N increases the cost.

Ti: 0.005% or more and 0.10% or less

Titanium (Ti) is an element that can contribute to an increase in strength by forming fine carbonitrides. Further, Ti is necessary to prevent B that is an essential element of the disclosed embodiments from reacting with N. The Ti content is required to be 0.005% or more to exhibit the desired effect. Preferably, Ti content is 0.010% or more, more preferably, 0.015% or more, or still more preferably, 0.020% or more. On the other hand, the high Ti content significantly decreases elongation, and thus the Ti content is 0.10% or less. Preferably, Ti content is 0.08% or less. More preferably, the Ti content is 0.06% or less, or still more preferably, 0.04% or less.

B: 0.0002% to 0.004%

Boron (B) is an element that improves hardenability and it contributes to an increase in strength by facilitating formation of a second phase. B is an effective element for securing hardenability. B is an element that does not lower the martensite transformation starting point. Since B segregates at the grain boundary to improve grain boundary strength, B is effective in resistance to delayed fracture. The B content is 0.0002% or more to exhibit this effect. Preferably, B content is 0.0005% or more, or more preferably, 0.0010% or more, or still more preferably, 0.0015% or more. However, since excessive B content degrades toughness, and crack-resistant characteristic against resistance welding, the B content is 0.004% or less. Preferably, the B content is 0.0035% or less. More preferably, the B content is 0.0030% or less, or still more preferably, 0.0025% or less.

In the disclosed embodiments, in addition to the components described above, one or two of the following components are contained. When the content of Mo, Cr described below is less than the lower limit, these elements are included as unavoidable impurities.

Mo: 0.005% or more and 0.50% or less

Molybdenum (Mo) contributes to increased high strength by promoting formation of the second phase. It is an element that stabilizes austenite during annealing, and that is necessary for controlling the fraction of the second phase. It is necessary to contain 0.005% or more of Mo to obtain the desired effect. Preferably, the Mo content is 0.010% or more. More preferably, the Mo content is 0.080% or more, or still more preferably, 0.100% or more. On the other hand, the excessive Mo content causes excessive forming of the second phase, thus resulting in degraded elongation and bendability. Therefore, the Mo content is 0.50% or less. Preferably, the Mo content is 0.40% or less, or more preferably 0.35% or less, or still more preferably, 0.30% or less.

Cr: 0.005% to 1.0%

Chromium (Cr) contributes to increased high strength by promoting formation of the second phase. It is an element that stabilizes austenite during annealing, and that is necessary for controlling the fraction of the second phase. It is necessary to contain 0.005% or more of Cr to obtain the desired effect. Preferably, the Cr content is 0.01% or more. More preferably, the Cr content is 0.10% or more, or still more preferably, 0.15% or more. On the other hand, the excessive Cr content causes excessive forming of the second phase, thus resulting in degradation of elongation and bendability, and further causes excessive forming of the surface oxides, thus resulting in degradation of galvanization and chemical convertibility, which greatly affects the bendability. Therefore, the Cr content is 1.0% or less. Preferably, the Cr content is 0.8% or less, or more preferably 0.7% or less, or still more preferably, 0.6% or less.

In the disclosed embodiments, in addition to the components described above, one or two or more of the following components may be contained.

V: 0.05% or less

Vanadium (V) contributes to an increase in strength by forming fine carbonitrides. To have this effect, the V content is preferably 0.01% or more. On the other hand, the excessive V content reduces the toughness at resistance welding and degrades the crack-resistant characteristic against resistance welding, and thus the V content is 0.05% or less. Preferably, the V content is 0.03% or less.

Nb: 0.50% or less

As with V, niobium (Nb) can also contribute to an increase in strength by forming fine carbonitrides thereof. The lower limit of the Nb content is preferably 0.005% to exhibit the desired effect. More preferably, the Nb content is 0.01% or more, or still more preferably, 0.10% or more. On the other hand, the excessive Nb content not only significantly degrades the ductility, but also significantly degrades the recrystallization rate, which results in increased number of non-recrystallized ferrite, and accordingly, the desired steel sheet structure cannot be obtained. Therefore, the Nb content is 0.50% or less. Preferably, the Nb content is 0.30% or less.

Cu: 0.30% or less

Copper (Cu) is an element that contributes to an increase in strength by solid-solution strengthening and also contributes to an increase in strength by facilitating the formation of a second phase, and thus can be contained according to need. The Cu content is preferably 0.05% or more to exhibit the desired effect. More preferably, the Cu content is 0.10% or more, or still more preferably, 0.15% or more. On the other hand, even when the Cu content exceeds 0.30%, the effect is saturated and surface defects due to Cu tend to occur. Therefore, the Cu content is 0.30% or less. Preferably, the Cu content is 0.25% or less.

Ni: 0.05% or less

Likewise in the case of Cu, nickel (Ni) is an element that contributes to an increase in strength by solid-solution strengthening and also contributes to an increase in strength by facilitating the formation of a second phase, and thus can be contained according to demand. The Ni content is preferably 0.002% or more to exhibit these effects. More preferably, the Ni content is 0.010% or more, or still more preferably, 0.020% or more. When added at the same time as Cu, Ni has an effect of preventing surface defects caused by Cu. Accordingly, it is effective to add Ni when Cu is added. On the other hand, the excessive Ni content reduces the toughness at resistance welding and degrades the crack-resistant characteristic against resistance welding, and thus the Ni content is 0.05% or less. Preferably, the Ni content is 0.04% or less.

Ca and/or REM: 0.0050% or less

Calcium (Ca) and REM are elements that changes the shape of the sulfide into a spheroid to reduce the adverse effect on bendability and may be added as needed. The total content (or, the content of the component, when only one is contained) is preferably 0.0005% or more to exhibit these effects. More preferably, the total content is 0.0010% or more. On the other hand, total content is 0.0050% or less because the effect is saturated even when the total content is more than 0.0050%. Preferably, the total content is 0.0030% or less.

The balance other than the components described above is Fe and unavoidable impurities. The unavoidable impurities include antimony (Sb), zinc (Zn), cobalt (Co), tin (Sn), zirconium (Zr) and the like, for example, and the allowable range of these contents is Sb: 0.01% or less, Zn: 0.01% or less, Co: 0.10% or less, Sn: 0.10% or less and Zr: 0.10% or less. In the disclosed embodiments, even when Ta and Mg are contained within the ranges in a usual steel composition, the effect of the disclosed embodiments is not lost. By "within the range in a usual steel composition", it means 0.01% or less.

Next, the multi-phase structure of the high-strength steel sheet of the disclosed embodiments will be described in detail. The multi-phase structure of the high-strength steel sheet of the disclosed embodiments includes ferrite and martensite. Residual austenite, bainite may be contained. Further, the balance may include other structures. This will be described in detail below. In the description below, volume fraction refers to the volume fraction for the whole steel sheet.

Ferrite

The multi-phase structure of the high-strength steel sheet of the disclosed embodiments has a ferrite volume fraction of 35% to 65%. It is difficult to achieve tensile strength of 980 MPa when the ferrite volume fraction is more than 65%. Preferably, the ferrite volume fraction is 60% or less or less than 60%. More preferably, the ferrite volume fraction is 55% or less, or still more preferably, 50% or less. When the volume fraction is less than 35%, since the second phase is excessively formed, voids are easily generated during punching in the hole expansion test, thus resulting in degraded hole expandability. Therefore, the ferrite volume fraction is 35% or more. Preferably, ferrite volume fraction is 37% or more, or more preferably, 40% or more.

The average crystal grain size of the ferrite is 8 μm or less. When the average crystal grain size of ferrite is more than 8 μm, the grain becomes even coarser at resistance welding, thus resulting in degraded toughness and occurrence of the cracks. Therefore, the average crystal grain size of ferrite is 8 μm or less. Preferably, the average crystal grain size of ferrite is 6 μm or less, or more preferably 5 μm or less, or still more preferably, 4 μm or less. While there is no particular lower limit defined, it is usually 0.5 μm or more in many cases.

The average aspect ratio of the ferrite is 3.5 or less. When the average aspect ratio of ferrite is more than 3.5, the voids generated during punching in the hole expansion test are easily connected with each other during hole expansion, thus resulting in degraded hole expandability. Therefore, the average aspect ratio of ferrite is 3.5 or less. Preferably, the average aspect ratio of ferrite is 3.0 or less. More preferably, the average aspect ratio of ferrite is 2.5 or less. The aspect ratio referred herein is a value obtained by converting a grain into an ellipse equivalent and dividing the long diameter by the short diameter (long diameter/short diameter). As is clear from the above definition, the aspect ratio is 1.0 or more. Usually, the aspect ratio is 1.3 or more in many cases.

Residual Austenite

The multi-phase structure of the high-strength steel sheet of the disclosed embodiments may not contain residual austenite. The residual austenite improves the balance between strength and elongation by strain-induced martensitic transformation. The residual austenite is preferably contained 1% or more in terms of volume fraction to obtain this effect. However, since the residual austenite is hardened by martensitic transformation, it tends to generate voids during punching in the hole expansion test. Therefore, the volume fraction of the residual austenite should be less than 7%. Preferably, the volume fraction is 5% or less. More preferably, the volume fraction is 3% or less. The volume fraction of the residual austenite may be 0%.

Martensite

The multi-phase structure of the high-strength steel sheet of the disclosed embodiments has a martensite volume fraction of 20% to 60%. The martensite volume fraction is 20% or more to ensure the desired strength. Preferably, the martensite volume fraction is 30% or more, or more preferably, more than 35%, or still more preferably, 40% or more. Most preferably, the martensite volume fraction is less than 45%. On the other hand, when the martensite volume fraction is more than 60%, the occurrence of voids excessively increases after punching in the hole expansion test, thus resulting in degraded hole expandability. Therefore, the upper limit of martensite volume fraction is 60%. Preferably, the upper limit is 56% or less, or more preferably 52% or less. While the "martensite" as used herein refers to the martensite generated after annealing, this includes self-tempered (auto-tempered) martensite after martensite transformation during cooling after annealing, the tempered martensite tempered after martensite transformation, and fresh martensite transformed from austenite into martensite without being tempered.

The average crystal grain size of martensite is 3 μm or less. When the average crystal grain size of martensite is more than 3 μm, the grain becomes even coarser during resistance welding, thus resulting in degraded toughness and occurrence of the cracks. Therefore, the average crystal grain size of martensite is 3 μm or less. When the average crystal grain size of martensite is more than 3 μm, voids formed at the interface between martensite and ferrite are more likely to be connected, thus resulting in degraded hole expandability. Therefore, the upper limit is 3 μm. The preferred average crystal grain size is 2 μm or less. The average crystal grain size of martensite is preferably as small as possible. The average crystal grain size of martensite is 0.5 μm or more in many cases.

Bainite

The multi-phase structure of the high-strength steel sheet of the disclosed embodiments may include bainite. The bainite contributes to high strength. Preferably, the volume fraction of bainite is 1% or more to obtain this effect. More preferably, the bainite content is 2% or more, or still more preferably, 3% or more. On the other hand, when the volume fraction of bainite with high dislocation density is more than 20%, the occurrence of voids excessively increases after punching in the hole expansion test and the hole expandability is degraded. Therefore, the volume fraction of bainite should be 20% or less. Preferably, the volume fraction is 15% or less, or more preferably, 10% or less. The volume fraction of bainite may be 0%.

The sum of martensite and bainite is preferably 45% or more, or more preferably 50% or more.

When the bainite described above is included, and when the average crystal grain size of bainite is more than 3 μm, the grain becomes even coarser during resistance welding, thus resulting in degraded toughness and occurrence of the cracks. Therefore, the average crystal grain size of bainite is 3 μm or less. The average crystal grain size of bainite is preferably as small as possible. The average crystal grain size of bainite is 0.5 μm or more in many cases.

Balance Structure

The multi-phase structure of the high-strength steel sheet of the disclosed embodiments may include pearlite, non-recrystallized ferrite, and spheroidal cementite other than ferrite, bainite, martensite and residual austenite. Even when this balance structure is included, the effect of the disclosed embodiments can still be obtained if the above-mentioned composition, multi-phase structure, and standard deviation of Vickers hardness described below are satisfied. However, the volume fraction of pearlite is preferably 5% or less, or more preferably, 3% or less. Since the total volume fraction of ferrite, bainite, martensite and residual austenite is preferably 90% or more, the balance structure is preferably 10% or less.

Next, the standard deviation of the Vickers hardness, which is the characteristic of the high-strength steel sheet of the disclosed embodiments, will be described. The standard deviation of the Vickers hardness in the disclosed embodiments refers to the standard deviation of the Vickers hardness measured at 200 μm intervals from a position of 100 μm away from the surface to the central portion in the thickness direction of the sheet. In the disclosed embodiments, the standard deviation is 30 or less. The standard deviation is indicative of the Mn bands, and if the standard deviation is more than 30, there an increased difference in micro hardness, and bendability and hole expandability are degraded. Furthermore, when the standard deviation is more than 30, segregation at the edge portion of the nugget is further promoted because the Mn enriched part is locally decreased in the freezing point during resistance welding, a difference in hardness occurs and resistance weld cracks occur significantly. In the disclosed embodiments, the standard deviation is 5 or more and 15 or more in many cases.

Next, there will be described a case where the high-strength steel sheet of the disclosed embodiments has a plated layer.

The type of the plated layer is not particularly limited, and may be any of a hot-dip plated layer and an electroplated layer, for example. The plated layer may be an alloyed plated layer. Since the plating metal is not particularly limited, in addition to the Zn plating described above, Al plating or the like may also be used.

A preferable plated layer in the disclosed embodiments is, for example, a hot-dip galvanized layer having a coating weight of 20 to 120 g/m² per side and a hot-dip galvannealed layer, which is formed further by alloying a galvanized layer. It may be difficult to secure corrosion resistance with the coating weight less than 20 g/m². On the other hand, when the coating weight exceeds 120 g/m², the resistance to coat peeling may be degraded. Therefore, the coating weight is preferably within the range described above.

Next, a method for producing a high-strength steel sheet according to the disclosed embodiments will be described. A method for producing a high-strength steel sheet includes: a hot rolling step of hot-rolling a steel material under a condition in which a rolling reduction rate of a final pass of a finish rolling is 12% or more, the rolling reduction rate of the pass before the final pass is 15% or more, a finish rolling starting temperature is 1000° C. to 1150° C., and a finish rolling finishing temperature is 850° C. to 950° C.; a primary cooling step of cooling the hot-rolled steel sheet obtained in the hot rolling step at a first average cooling rate of 75° C./s or higher up to a cooling stop temperature, the cooling stop temperature being 700° C. or lower; a secondary cooling step of cooling the steel sheet obtained in the primary cooling step under a condition of a second average cooling rate of 5° C./s to 50° C./s up to a coiling temperature, and a coiling step of coiling the steel sheet at a coiling temperature of 600° C. or lower; a pickling step of pickling the hot-rolled steel sheet after the coiling step, and a cold rolling step of cold-rolling the pickled steel sheet; and an annealing step of heating the cold-rolled steel sheet obtained in the cold rolling step at an average heating rate of 3° C./s to 30° C./s up to a temperature range of 760° C. to 900° C., holding the steel sheet at soaking temperature in the temperature range of 760° C. to 900° C. for 15 seconds or longer, and then cooling the steel sheet under a condition of an average cooling rate of 3° C./s to 30° C./s up to a cooling stop temperature, the cooling stop temperature being 600° C. or lower. The above process will be divided into hot rolling step until coiling, pickling step for pickling, cold rolling step for cold rolling, and annealing step after cold rolling and each of them will be separately described.

Hot Rolling Step

For example, the hot rolling may preferably start at 1150° C. to 1270° C. without reheating a steel slab prepared by casting, or start after reheating to 1150° C. to 1270° C. Although the hot rolling starting temperature is not particularly limited, it is preferably 1150° C. to 1270° C. In the disclosed embodiments, after producing the steel slab, in addition to the conventional method of once cooling a steel slab to room temperature and then reheating it, an energy-saving process such as charging the steel slab into a soaking furnace as is hot without cooling, heat-retaining the steel slab and directly rolling, or direct rolling or hot direct rolling, that is, rolling the steel slab directly after casting can be applied without problem.

The rolling reduction rate of 12% or more for the final pass of the finish rolling is necessary from the viewpoint that it introduces a large number of shear bands in the austenite grains, increases the nucleation sites of the ferrite transformation after hot rolling, promotes refining of microstructure of the hot rolled sheet, and eliminates the Mn bands. Preferably, the rolling reduction rate is 13% or more. Although the upper limit is not particularly limited, it is preferably 30% or less because, as the hot rolling load increases, the sheet thickness variation in the width direction of the sheet increases and the crack-resistant characteristic against resistance welding is liable to degrade.

The rolling reduction rate of 15% or more for the pass before the final pass is necessary from the viewpoint that it increases the strain accumulation effect, introduces a large number of shear bands into the austenite grains, further increases the nucleation sites of ferrite transformation, further refines the hot-rolled steel sheet structure and eliminates the Mn bands. Preferably, the rolling reduction rate is 18% or more. More preferably, it is 20% or more. Although the upper limit is not particularly limited, it is preferably 30% or less because the sheet thickness variation in the width direction of the sheet increases and the crack-resistant characteristic against resistance welding is liable to degrade as the hot rolling load increases.

Since the dynamic recrystallization is promoted with the finish rolling starting temperature of 1000° C. or higher, recrystallization proceeds uniformly. Thus, there is an effect of reducing Mn band. The finish rolling starting temperature of 1150° C. or lower avoid making the y grain diameter coarse, thus providing the effect that the steel sheet structure after annealing is refined. When the finish rolling starting temperature is within the above range, the crack-resistant characteristic against resistance welding is improved.

The finish rolling finishing temperature is between 850° C. and 950° C. Hot rolling is required to be completed in the austenite single phase region to improve the crack-resistant characteristic against resistance welding after annealing by making the structure uniform in the steel sheet and reducing the anisotropy of the material. Therefore, the finish rolling finishing temperature is 850° C. or higher. On the other hand, when the finish rolling temperature exceeds 950° C., the structure after the hot rolling coarsens and the grain after the annealing also coarsens. Accordingly, the finish rolling finishing temperature is 950° C. or lower.

Cooling is performed after finish rolling. Specifically, after cooling to 700° C. or lower at a first average cooling rate of 75° C./s or higher as the primary cooling, the secondary cooling is performed to 600° C. or lower at a second average cooling rate of 5° C./s to 50° C./s.

The ferrite transformation of austenite occurs during cooling that follows after the hot rolling, but since the ferrite coarsens at high temperature, after the hot rolling, quenching is carried out to homogenize the structure as much as possible and at the same time to prevent the occurrence of the precipitates. Therefore, as the primary cooling, cooling down to 700° C. or lower at a first average cooling rate of 75° C./s or higher is carried out. If the first average cooling rate is less than 75° C./s, the ferrite coarsens. Therefore, the steel sheet structure of the hot-rolled steel sheet becomes inhomogeneous and the bendability is degraded. Although the upper limit of the first average cooling rate is not particularly limited, it is usually 300° C./s or less. When the temperature (cooling stop temperature) to which cooling is performed in the primary cooling exceeds 700° C., pearlite is excessively produced in the steel sheet structure of the hot-rolled steel sheet, and the final steel sheet structure becomes heterogeneous, thus resulting in degraded bendability. The stop temperature of the primary cooling is preferably 580° C. or higher and 670° C. or lower in consideration of need for the secondary cooling.

In the subsequent secondary cooling, cooling is performed to a coiling temperature of 600° C. or lower at a second average cooling rate of 5° C./s to 50° C./s. When the second average cooling rate is less than 5° C./s or when cooling exceeds 600° C., ferrite or pearlite is excessively formed in the steel sheet structure of the hot-rolled steel sheet, the steel sheet structure after annealing coarsens, and the Mn band is easily generated, thus resulting in degraded bendability of the steel sheet after annealing, and the crystal grain size also increases, which also degrades crack-resistant characteristic against resistance welding. To effectively perform the secondary cooling, the starting temperature of the secondary cooling is preferably 580° C. or higher and 670° C. or lower.

The coiling temperature is 600° C. or lower. When the coiling temperature is more than 600° C., ferrite and pearlite are excessively formed in the steel sheet structure of the hot-rolled steel sheet and the final steel sheet structure becomes inhomogeneous, thus resulting in degraded bendability. Furthermore, because the crystal grain size also increases, the crack-resistant characteristic against resistance welding also degrades, and thus, the upper limit of the temperature is 600° C. Preferably, the upper limit of the temperature is 550° C. or lower. Although there is no particular lower limit of the coiling temperature defined, when the coiling temperature is too low, hard martensite is excessively formed and the cold rolling load increases. Therefore, the lower limit of coiling temperature is preferably 300° C. or more.

Pickling Step

The pickling step follows after the hot rolling step, to remove the scale of the hot rolled sheet (hot-rolled steel sheet) surface layer. The pickling step is not particularly limited, and it may be carried out according to a conventional method.

Cold Rolling Step

In the cold rolling step, rolling to a cold rolled sheet of a predetermined sheet thickness is carried out. The cold rolling step is not particularly limited and may be carried out in a usual manner. The rolling reduction rate in cold rolling is preferably 25% or more and 85% or less.

Annealing Step

Annealing is carried out to promote recrystallization and to form fine bainite, residual austenite and martensite in the steel sheet structure in order to achieve high strength. For that purpose, the annealing step includes heating to a temperature range of 760° C. to 900° C. at an average heating rate of 3° C./s to 30° C./s, holding for 15 seconds or more in the temperature range of 760° C. to 900° C. as the soaking temperature, and after holding, cooling down under the condition that the average cooling rate to the cooling stop temperature is 3° C./s to 30° C./s and the cooling stop temperature is 600° C. or lower.

First, the cold rolled steel sheet is heated under the condition that the average heating rate is 3° C./s to 30° C./s. As a result, the grain after annealing can be refined. Since the recrystallization hardly proceeds when the cold rolled steel sheet is heated rapidly, the upper limit of the average heating rate is 30° C./s. When the heating rate is too low, ferrite and martensite grains coarsen and a predetermined average crystal grain size cannot be obtained, and thus, an average heating rate of 3° C./s or more is necessary. Preferably, it is 5° C./s or more. The heating is done to a temperature between 760° C. and 900° C. The heating is performed typically up to the soaking temperature.

The soaking temperature (holding temperature) is set as 760° C. to 900° C. Regarding the soaking temperature, soaking is done at the temperature region of the dual-phase zone of ferrite and austenite or the austenite single phase zone. When the soaking temperature is lower than 760° C., the ferrite fraction increases, making it difficult to secure the strength. Accordingly, the lower limit of the soaking temperature is 760° C. When the soaking temperature is too high, the grain growth of austenite becomes prominent, and since the grain coarsens, the crack-resistant characteristic against resistance welding degrades. Accordingly, the upper limit of the soaking temperature is 900° C. Preferably, the upper limit of the soaking temperature is 880° C. or lower.

The soaking time is 15 seconds or more. At the abovementioned soaking temperature, the soaking time is required to be 15 seconds or more for the progress of recrystallization and the austenite transformation of part or all of the structure. The upper limit is not particularly limited, but if the soaking time is excessively long, microsegregation of Mn is promoted, which degrades the bendability. Accordingly, the upper limit is preferably 1200 seconds or less.

After the soaking described above, cooling is performed down to a cooling stop temperature of 600° C. or lower at an average cooling rate of 3° C./s to 30° C./s. When the average cooling rate is less than 3° C./s, ferrite transformation proceeds during cooling and the volume fraction of the second phase decreases, making it difficult to secure strength. On the other hand, when the average cooling rate exceeds 30° C./s, martensite is excessively produced, although it is difficult to realize this in the actual facilities. When the cooling stop temperature exceeds 600° C., pearlite is excessively formed, and a predetermined volume fraction in the microstructure of the steel sheet cannot be obtained, thus resulting in degraded workability and crack-resistant characteristic against resistance welding. Although the lower limit of the cooling stop temperature is not particularly limited, it is generally 500° C. or higher.

After annealing, plating such as hot-dip galvanization may be applied, or the cold rolled annealed steel sheet may be left without plating. If a predetermined volume fraction or the like is obtained, workability and crack-resistant characteristic against resistance welding can be secured. The plating step will be described below.

After annealing, for example, hot-dip galvanization may be applied under normal conditions. The temperature of the steel sheet immersed in the plating bath is preferably from a temperature of (hot-dip galvanized bath temperature minus 40° C.) to a temperature of (hot-dip galvanized bath temperature plus 50° C.). When the steel sheet temperature immersed in the plating bath falls below the temperature of (hot-dip galvanized bath temperature minus 40° C.), a portion of the molten zinc solidifies when the steel sheet is immersed in the plating bath and the plating appearance may be degraded, and thus, the lower limit is the temperature of (hot-dip galvanized bath temperature minus 40° C.). When the temperature of the steel sheet immersed in the plating bath exceeds the temperature of (hot-dip galvanized bath temperature plus 50° C.), the temperature of the plating bath rises, causing a problem in mass productivity.

After plating, the galvanized steel sheet can be subjected to alloying treatment at a temperature range between 450° C. and 600° C. By performing alloying treatment in the temperature range of 450° C. to 600° C., the Fe concentration in the plating becomes 7% to 15%, and adhesion of the plating and corrosion resistance after painting are improved. When the temperature is lower than 450° C., the alloying does not sufficiently proceed and the sacrificial anticorrosive effect is degraded and the sliding property is degraded. At a temperature higher than 600° C., the progress of alloying becomes prominent and the powdering resistance is degraded.

Regarding hot-dip galvanization, using a galvanizing bath containing, in mass %, 0.10% to 0.20 of Al is preferable. After plating, wiping may be performed to adjust the coating weight.

Temper rolling may be performed after annealing or after plating. A preferred range of elongation percentage is 0.05% to 2.0%.

Example

Hereinafter, examples of the disclosed embodiments will be described. However, the disclosed embodiments is not limited by any of the following examples, and it is also possible to carry out the disclosed embodiments with appropriate modifications within a range that can be adapted to the gist of the disclosed embodiments, and all of these are included in the scope of the disclosed embodiments.

After producing slabs by casting the steel of the composition shown in Table 1, hot rolling was performed at a heating temperature of hot rolling of 1250° C., under conditions of the finish rolling starting temperature as shown in Table 2, the finish rolling finishing temperature (FDT) as shown in Table 2 and the rolling reduction rate as shown in Table 2 to obtain a hot-rolled steel sheet, followed by cooling to the first cooling temperature at the first average cooling rate shown in Table 2, and then cooling to the coiling temperature at the second average cooling rate, and coiling at the coiling temperature (CT). Then the obtained hot rolled sheet was pickled and subjected to cold rolling at a rolling reduction rate shown in Table 2, which produced a cold rolled sheet (sheet thickness: 1.4 mm). The cold rolled steel sheet thus obtained was annealed in continuous annealing line (CAL) or continuous hot-dip galvanizing line (CGL) according to the production conditions shown in Table 2 to obtain a cold rolled steel sheet (CR). Some of them were subjected to hot-dip galvanizing treatment to obtain hot-dip galvanized steel sheet (GI), some of which were further subjected to alloying treatment at the temperature shown in Table 2 to obtain a hot-dip galvannealed steel sheet (GA). The galvanizing bath temperature was 460° C., the galvanizing bath Al concentration was 0.14 mass % (in the case that alloying treatment is done) or 0.18 mass % (in the case that no alloying treatment is done), and the coating weight per side is 45 g/m² (for double-sided plating). Some of the steel sheets are hot-dip galvanized steel sheet (GI) without alloying treatment.

TABLE 1

| Steel No. | Composition (mass %) | | | | | | | | | | | | Remarks |
|---|---|---|---|---|---|---|---|---|---|---|---|---|---|
| | C | Si | Mn | P | S | Al | N | Ti | B | Cr | Mo | Other components | |
| A | 0.08 | 0.98 | 1.95 | 0.01 | 0.001 | 0.03 | 0.002 | 0.012 | 0.0012 | 0.45 | — | — | Suitable Steel |
| B | 0.11 | 0.54 | 2.01 | 0.01 | 0.001 | 0.02 | 0.003 | 0.021 | 0.0012 | — | 0.21 | — | Suitable Steel |
| C | 0.07 | 1.35 | 1.84 | 0.01 | 0.002 | 0.005 | 0.002 | 0.015 | 0.0017 | 0.25 | 0.11 | V: 0.01 | Suitable Steel |
| D | 0.12 | 0.35 | 1.49 | 0.01 | 0.001 | 0.03 | 0.003 | 0.028 | 0.0035 | 0.35 | 0.28 | Nb: 0.15 | Suitable Steel |
| E | 0.11 | 1.22 | 1.59 | 0.01 | 0.001 | 0.02 | 0.002 | 0.033 | 0.0020 | 0.38 | 0.22 | Cu: 0.22 | Suitable Steel |
| F | 0.09 | 1.15 | 2.03 | 0.02 | 0.002 | 0.03 | 0.003 | 0.025 | 0.0018 | — | 0.34 | Ni: 0.03 | Suitable Steel |
| G | 0.12 | 0.88 | 1.46 | 0.01 | 0.001 | 0.03 | 0.001 | 0.021 | 0.0022 | 0.78 | — | Ca: 0.002 | Suitable Steel |
| H | 0.11 | 1.23 | 1.85 | 0.02 | 0.002 | 0.03 | 0.002 | 0.012 | 0.0018 | 0.15 | 0.25 | REM: 0.002 | Suitable Steel |
| I | 0.08 | 0.89 | 2.12 | 0.01 | 0.002 | 0.03 | 0.001 | 0.025 | 0.0015 | — | — | — | Com. Ex. |
| J | 0.18 | 0.25 | 1.54 | 0.02 | 0.002 | 0.04 | 0.003 | 0.015 | 0.0019 | 0.33 | 0.10 | — | Com. Ex. |
| K | 0.11 | 2.13 | 1.66 | 0.01 | 0.001 | 0.03 | 0.002 | 0.022 | 0.0021 | 0.45 | — | — | Com. Ex. |
| L | 0.08 | 1.08 | 0.85 | 0.01 | 0.002 | 0.03 | 0.002 | 0.031 | 0.0015 | 0.78 | 0.25 | — | Com. Ex. |
| M | 0.09 | 0.89 | 2.84 | 0.01 | 0.002 | 0.03 | 0.002 | 0.025 | 0.0025 | 0.25 | — | — | Com. Ex. |
| N | 0.07 | 0.65 | 1.98 | 0.01 | 0.003 | 0.03 | 0.003 | 0.022 | 0.0018 | 1.45 | 0.12 | — | Com. Ex. |
| O | 0.08 | 1.15 | 1.88 | 0.01 | 0.003 | 0.02 | 0.002 | 0.031 | 0.0025 | 0.11 | 0.94 | — | Com. Ex. |

*Values outside the range of the disclosed embodiments are underlined.

TABLE 2

| Sample No. | Steel No. | Hot-rolling | | | | | | | | Cold-rolling Reduction rate % |
|---|---|---|---|---|---|---|---|---|---|---|
| | | Reduction rate of pass before final pass % | Reduction rate of final pass % | Finish rolling starting temperature ° C. | FDT ° C. | First average cooling rate ° C./s | First cooling temperature ° C. | Second average cooling rate ° C./s | CT ° C. | |
| 1 | A | 18 | 13 | 1080 | 900 | 110 | 620 | 25 | 550 | 60 |
| 2 | B | 18 | 12 | 1080 | 900 | 100 | 620 | 25 | 550 | 60 |
| 3 | C | 18 | 13 | 1080 | 900 | 100 | 600 | 20 | 500 | 60 |
| 4 | D | 18 | 14 | 1080 | 900 | 100 | 620 | 20 | 550 | 40 |
| 5 | E | 18 | 15 | 1080 | 900 | 100 | 620 | 20 | 550 | 60 |
| 6 | F | 20 | 12 | 1080 | 900 | 110 | 620 | 25 | 500 | 50 |
| 7 | G | 18 | 15 | 1080 | 900 | 100 | 650 | 20 | 500 | 50 |
| 8 | H | 18 | 15 | 1080 | 900 | 150 | 650 | 20 | 500 | 50 |
| 9 | A | 18 | 15 | 1080 | 900 | 30 | 650 | 20 | 500 | 50 |
| 10 | A | 18 | 15 | 1080 | 900 | 100 | 750 | 20 | 500 | 50 |
| 11 | A | 18 | 13 | 1080 | 900 | 100 | 620 | 2 | 550 | 50 |
| 12 | A | 18 | 13 | 1080 | 900 | 100 | 680 | 10 | 650 | 50 |
| 13 | B | 18 | 14 | 1080 | 900 | 100 | 620 | 25 | 550 | 60 |
| 14 | B | 18 | 13 | 1080 | 920 | 100 | 600 | 25 | 550 | 60 |
| 15 | B | 18 | 15 | 1080 | 900 | 100 | 600 | 25 | 500 | 50 |

TABLE 2-continued

| | | | | | | | | | | |
|---|---|---|---|---|---|---|---|---|---|---|
| 16 | B | 18 | 15 | 1080 | 900 | 100 | 620 | 20 | 500 | 65 |
| 17 | B | 18 | 15 | 1080 | 880 | 100 | 620 | 25 | 550 | 50 |
| 18 | B | 18 | 15 | 1080 | 900 | 100 | 620 | 25 | 550 | 60 |
| 19 | I | 18 | 15 | 1080 | 900 | 100 | 600 | 20 | 500 | 60 |
| 20 | J | 18 | 15 | 1080 | 900 | 100 | 650 | 20 | 500 | 50 |
| 21 | K | 18 | 15 | 1080 | 900 | 100 | 600 | 25 | 500 | 50 |
| 22 | L | 18 | 15 | 1080 | 900 | 100 | 620 | 25 | 500 | 50 |
| 23 | M | 18 | 13 | 1080 | 900 | 100 | 620 | 25 | 500 | 50 |
| 24 | N | 18 | 15 | 1080 | 900 | 100 | 620 | 25 | 500 | 60 |
| 25 | O | 18 | 15 | 1080 | 900 | 100 | 620 | 25 | 500 | 60 |
| 26 | A | 18 | 12 | 1230 | 900 | 100 | 620 | 25 | 550 | 60 |
| 27 | A | 18 | 12 | 930 | 900 | 100 | 620 | 25 | 550 | 60 |

| | Second annealing | | | | | | |
|---|---|---|---|---|---|---|---|
| Sample No. | Average heating rate °C./s | Soaking temperature °C. | Holding time sec | Average cooling rate °C./s | Cooling stop temperature °C. | Alloying temperature °C. | Remarks |
| 1 | 8 | 820 | 180 | 7 | 525 | — | Example |
| 2 | 8 | 820 | 180 | 7 | 525 | — | Example |
| 3 | 8 | 820 | 300 | 7 | 525 | 525 | Example |
| 4 | 8 | 800 | 300 | 10 | 525 | 600 | Example |
| 5 | 5 | 850 | 180 | 12 | 525 | — | Example |
| 6 | 8 | 850 | 180 | 5 | 525 | — | Example |
| 7 | 15 | 800 | 300 | 7 | 525 | — | Example |
| 8 | 8 | 830 | 300 | 10 | 525 | 525 | Example |
| 9 | 8 | 850 | 300 | 5 | 525 | — | Com. Ex. |
| 10 | 8 | 850 | 600 | 7 | 525 | — | Com. Ex. |
| 11 | 8 | 850 | 300 | 7 | 525 | 525 | Com. Ex. |
| 12 | 8 | 830 | 300 | 7 | 525 | — | Com. Ex. |
| 13 | <u>1</u> | 830 | 300 | 7 | 525 | — | Com. Ex. |
| 14 | 8 | <u>700</u> | 300 | 7 | 525 | — | Com. Ex. |
| 15 | 8 | <u>950</u> | 300 | 7 | 525 | 525 | Com. Ex. |
| 16 | 8 | 830 | <u>2</u> | 7 | 525 | — | Com. Ex. |
| 17 | 8 | 800 | 300 | <u>1</u> | 525 | — | Com. Ex. |
| 18 | 8 | 850 | 300 | 7 | <u>700</u> | 525 | Com. Ex. |
| 19 | 8 | 830 | 300 | 7 | 525 | — | Com. Ex. |
| 20 | 8 | 830 | 300 | 7 | 525 | — | Com. Ex. |
| 21 | 8 | 830 | 300 | 7 | 525 | — | Com. Ex. |
| 22 | 8 | 830 | 300 | 7 | 525 | — | Com. Ex. |
| 23 | 8 | 830 | 300 | 7 | 525 | — | Com. Ex. |
| 24 | 8 | 850 | 600 | 7 | 525 | — | Com. Ex. |
| 25 | 8 | 850 | 600 | 7 | 525 | 525 | Com. Ex. |
| 26 | 8 | 820 | 180 | 7 | 525 | — | Com. Ex. |
| 27 | 8 | 820 | 180 | 7 | 525 | — | Com. Ex. |

*Values outside the range of the disclosed embodiments are underlined.

A JIS No. 5 tensile test piece was obtained from the produced cold-rolled steel sheet so that the direction perpendicular to the rolling direction was the longitudinal direction (tensile direction), and yield strength (YS), tensile strength (TS) and elongation (EL) were measured by a tensile test (JIS Z2241 (1998)).

In the bending test, each test specimen having a size of 30 mm×100 mm was cut out from the annealed steel sheet to make a direction perpendicular to the rolling direction of the steel sheet parallel to the longitudinal direction of the test specimen. The resultant test pieces were each used for the bending test, which was a 90° V bending test (with a bend ridgeline thereof being along the rolling direction) by V-block method specified by JIS Z 2248 (1996). For the judgment of cracks, the outer surface and the cross section of the bent portion were examined using an optical microscope and SEM, and the results were indicated with the ratio (R/t) of the minimum bending radius R and the sheet thickness t (=1.4 mm) at which a crack was not found.

With respect to hole expandability, a hole of 10 mmφ in diameter was punched in a sample with a clearance of 12.5% according to JIS Z 2256 (2010), and the sample was set to a tester so that a burr faced the die side, and then hole expansion ratio (λ) was measured by forming with a conical punch of 60° C. When the hole expansion ratio λ (%) was 35% or more, hole expansion formability of the steel sheet was determined to be "good".

Regarding the test of resistance weld cracks, one test piece that is cut into 50×150 mm, the longer side of which is along the direction perpendicular to the rolling direction of the cold rolled steel sheet, and another piece of a 590 MPa class hot-dip galvanized steel sheet are subjected to resistance welding (spot welding). For a resistance welding machine, a servo motor pressurized type resistance welder of single-phase alternating current (50 Hz) attached to a welding gun is used to perform the resistance spot welding with respect to a pair of sheets in which the two steel sheets were stacked as a sample, with the pair of sheets being tilted by 4°. For welding conditions, pressurizing force was 3.8 kN and hold time was 0.2 seconds. The welding current and welding time were adjusted so that the nugget diameter was 5.9 mm. After welding, the sample was cut in half, and the cross section was observed with an optical microscope, and those without cracks of 0.1 mm or more observed were rated as having "good" crack-resistant characteristic against resistance welding resistance, while those having cracks of 0.1 mm or more observed were rated as having "poor" crack-resistant characteristic against resistance welding.

The volume fraction of ferrite and the volume fraction of martensite in each steel sheet were determined in a manner such that a sheet thickness cross section of the steel sheet that was parallel to the rolling direction of the steel sheet was polished, corroded with 3 vol % nital, and the microstructure thereof was observed at 2000 times or 5000 times magnification using a SEM (scanning electron microscope). In particular, the area fraction was measured by a point-counting method (in accordance with ASTM E562-83 (1988)), and the area fraction was regarded as the volume fraction. Since the area of ferrite and the area fraction of martensite each can be calculated such that photographs of ferrite grains or martensite grains identified in advance are taken from a photograph of the microstructure of the steel sheet using the software Image-Pro of Media Cybernetics, the average grain size of ferrite or martensite was determined such that the equivalent circle diameters of the ferrite grains or the martensite grains were calculated and were averaged. Regarding the aspect ratio of ferrite, the aspect ratios (major axis/minor axis) of respective grains were determined based on the photographs mentioned above and were averaged.

The volume fraction of residual austenite was determined such that the steel sheet was polished to a sheet thickness ¼ surface and the X-ray diffraction intensity from the sheet thickness ¼ surface was determined. The integrated intensity of the X-ray diffraction line from each of the {200} plane, {211} plane, and {220} plane of iron ferrite and the {200} plane, {220} plane, and {311} plane of austenite was measured at an accelerating voltage of 50 keV by X-ray diffractometry (equipment: RINT 2200 produced by Rigaku Corporation) using the Kα line of Mo as a line source. These measurements were used to determine the volume fraction of residual austenite using a calculation formula specified in "X-ray Diffraction Handbook" compiled by Rigaku Corporation, 2000, pp. 26 and 62-64.

The microstructure of the steel sheet was observed using a SEM (scanning electron microscope), a TEM (transmission electron microscope), and an FE-SEM (field emission scanning electron microscope). Bainite was observed and the volume fraction was obtained in the same manner as described above. The average crystal grain size of bainite was also calculated by calculating the equivalent circle diameter from the steel sheet structure photographs using the Image-Pro described above and averaging these values.

The standard deviation of the Vickers hardness was obtained by measuring Vickers hardness in five rows at 200 μm intervals from a position of 100 μm from the surface in the thickness direction of the sheet and averaging the measured results. The test force for the Vickers hardness measurement conditions was 2.942 N, and the holding time was 15 seconds.

Table 3 shows the measurement results of the measured steel sheet structure, tensile properties, bendability, crack-resistant characteristic against resistance welding, and the like.

TABLE 3

| | Steel sheet structure | | | | | | | | | |
|---|---|---|---|---|---|---|---|---|---|---|
| | Ferrite | | | | Martensite | | Bainite | | | |
| Sample No. | Vol. fraction % | Average aspect ratio | Average grain size μm | Residual austenite Vol. fraction % | Vol. fraction % | Average grain size μm | Vol. fraction % | Average grain size μm | Balance structure | Vickers hardness standard deviation |
| 1 | 45 | 2.5 | 4 | 2 | 48 | 2 | 5 | 2 | — | 21 |
| 2 | 41 | 2.2 | 4 | — | 50 | 2 | 9 | 2 | — | 24 |
| 3 | 49 | 2.8 | 5 | 1 | 42 | 2 | 8 | 2 | — | 28 |
| 4 | 38 | 1.9 | 3 | 2 | 51 | 2 | 9 | 2 | — | 25 |
| 5 | 53 | 2.3 | 4 | — | 47 | 2 | — | — | — | 18 |
| 6 | 43 | 2.5 | 5 | 1 | 48 | 2 | 8 | 2 | — | 23 |
| 7 | 46 | 2.4 | 4 | 5 | 40 | 2 | 9 | 2 | — | 24 |
| 8 | 45 | 2.2 | 4 | 2 | 49 | 2 | 4 | 2 | — | 23 |
| 9 | 47 | <u>3.6</u> | 5 | 2 | 45 | 2 | 6 | <u>4</u> | — | <u>33</u> |
| 10 | 46 | 3.3 | 4 | — | 47 | <u>4</u> | 7 | <u>4</u> | — | <u>34</u> |
| 11 | 48 | <u>3.7</u> | 5 | 2 | 44 | 3 | 6 | <u>4</u> | — | <u>46</u> |
| 12 | 47 | 3.3 | 6 | 2 | 48 | <u>4</u> | 3 | 3 | — | <u>37</u> |
| 13 | 52 | <u>3.9</u> | <u>9</u> | 2 | 41 | <u>4</u> | 5 | <u>4</u> | — | <u>32</u> |
| 14 | <u>88</u> | <u>3.8</u> | <u>11</u> | — | — | — | — | — | SC | 28 |
| 15 | <u>33</u> | 3.3 | 5 | — | <u>62</u> | <u>7</u> | 5 | <u>7</u> | — | <u>34</u> |
| 16 | <u>67</u> | 3.3 | 5 | — | 25 | 3 | 5 | 2 | SC | <u>35</u> |
| 17 | 62 | <u>3.7</u> | 5 | — | 32 | <u>4</u> | 2 | 2 | P | <u>33</u> |
| 18 | 58 | <u>3.6</u> | 6 | — | 31 | 3 | — | — | P | <u>36</u> |
| 19 | <u>71</u> | <u>3.7</u> | 7 | — | <u>18</u> | 2 | 2 | 2 | P | 28 |
| 20 | 41 | 2.8 | 6 | 4 | 48 | 3 | 7 | 3 | — | <u>35</u> |
| 21 | <u>67</u> | 3.4 | 7 | 5 | 25 | 2 | 3 | 2 | — | 25 |
| 22 | <u>66</u> | <u>3.8</u> | 4 | — | 32 | 2 | 2 | 1 | — | 24 |
| 23 | <u>33</u> | 2.1 | 3 | 4 | 59 | <u>5</u> | 4 | 2 | — | <u>59</u> |
| 24 | <u>28</u> | 2.4 | 3 | 3 | <u>62</u> | <u>4</u> | 7 | 3 | — | <u>43</u> |
| 25 | <u>30</u> | 2.3 | 4 | 3 | <u>63</u> | <u>4</u> | 4 | 2 | — | <u>48</u> |
| 26 | 50 | <u>3.7</u> | 6 | — | 45 | <u>4</u> | 5 | <u>4</u> | — | <u>42</u> |
| 27 | 52 | <u>3.8</u> | 5 | — | 42 | <u>4</u> | 6 | <u>5</u> | — | <u>39</u> |

TABLE 3-continued

| Sample No. | Tensile properties TS MPa | Tensile properties EL % | Hole expandability λ % | Bendability R/t | Crack-resistant characteristics against resistance welding | Type of Steel Sheet | Remarks |
|---|---|---|---|---|---|---|---|
| 1 | 1015 | 17.8 | 41 | 0.7 | Good | CR | Example |
| 2 | 1008 | 18.4 | 38 | 1.4 | Good | GI | Example |
| 3 | 1011 | 18.1 | 39 | 1.4 | Good | GA | Example |
| 4 | 1008 | 17.5 | 40 | 1.4 | Good | GA | Example |
| 5 | 988 | 18.3 | 36 | 1.1 | Good | CR | Example |
| 6 | 995 | 17.5 | 42 | 1.1 | Good | CR | Example |
| 7 | 994 | 18.2 | 38 | 1.1 | Good | CR | Example |
| 8 | 1001 | 17.9 | 39 | 1.4 | Good | GA | Example |
| 9 | 1005 | 17.4 | 35 | 1.8 | Good | CR | Com. Ex. |
| 10 | 998 | 17.2 | 29 | 1.8 | Poor | CR | Com. Ex. |
| 11 | 1033 | 16.2 | 25 | 2.1 | Poor | GA | Com. Ex. |
| 12 | 1025 | 17.3 | 34 | 1.8 | Poor | CR | Com. Ex. |
| 13 | 988 | 17.6 | 28 | 1.8 | Poor | CR | Com. Ex. |
| 14 | 612 | 25.8 | 43 | 0.7 | Good | CR | Com. Ex. |
| 15 | 1121 | 12.1 | 25 | 2.5 | Poor | GA | Com. Ex. |
| 16 | 825 | 19.3 | 28 | 1.4 | Good | GI | Com. Ex. |
| 17 | 905 | 18.8 | 32 | 1.4 | Good | CR | Com. Ex. |
| 18 | 971 | 17.1 | 34 | 1.8 | Poor | GA | Com. Ex. |
| 19 | 811 | 19.4 | 37 | 1.1 | Good | CR | Com. Ex. |
| 20 | 1092 | 17.8 | 22 | 1.4 | Poor | CR | Com. Ex. |
| 21 | 1053 | 17.3 | 39 | 1.4 | Poor | CR | Com. Ex. |
| 22 | 825 | 18.3 | 37 | 1.1 | Good | GI | Com. Ex. |
| 23 | 1142 | 13.8 | 24 | 2.5 | Poor | CR | Com. Ex. |
| 24 | 1175 | 14.3 | 23 | 2.5 | Poor | CR | Com. Ex. |
| 25 | 1164 | 14.2 | 20 | 2.5 | Poor | GA | Com. Ex. |
| 26 | 1002 | 16.7 | 22 | 2.5 | Poor | CR | Com. Ex. |
| 27 | 1015 | 17.1 | 28 | 2.5 | Poor | CR | Com. Ex. |

*Values outside the range of the disclosed embodiments are underlined.
*Balance structure: SC—spherical cementite, P— pearlite From the results shown in Table 3, it was confirmed that, with a specific composition, a specific steel sheet structure, and hardness adjustments of the surface, a high-strength steel sheet with excellent strength, elongation, hole expandability, bendability and crack-resistant characteristic against resistance welding can be obtained, which has tensile strength of 980 MPa or more, an elongation of 16.5% or more, a hole expansion ratio of 35% or more and a bendability (R/t) of 1.5 or less in a direction perpendicular to a rolling direction (where, R is the tip radius of the V block and t is the sheet thickness) and having crack-resistant characteristic against resistance welding such that cracks do not occur even during resistance welding with an electrode angled with respect to the steel sheet.

The invention claimed is:

1. A steel sheet having a chemical composition comprising, by mass %:
C: 0.05% to 0.15%,
Si: 1.6% or less,
Mn: 1.3% to 2.4%,
P: 0.05% or less,
S: 0.0050% or less,
Al: 0.01% to 0.10%,
N: 0.010% or less,
Ti: 0.005% to 0.10%,
B: 0.0002% to 0.004%, and
at least one of Mo: 0.005% to 0.50% and Cr: 0.005% to 1.0%,
the balance being Fe and unavoidable impurities; and
a multi-phase structure comprising, by volume fraction, ferrite in a range of 35% to 65%, residual austenite in a range of 7% or less, inclusive of 0%, martensite in a range of 20% to 60%, and bainite in a range of 20% or less, inclusive of 0%,
wherein the ferrite has an average crystal grain size of 8 μm or less and an average aspect ratio of 3.5 or less,
the martensite has an average crystal grain size of 3 μm or less,
the bainite has an average crystal grain sizes of 3 μm or less when contained, and
a standard deviation of Vickers hardness of the steel sheet is 30 or less when measured at 200 μm intervals from a position of 100 μm from a surface to a central position in a thickness direction of the steel sheet.

2. The steel sheet according to claim 1, wherein the chemical composition further comprises, by mass %, at least one selected from the group consisting of V: 0.05% or less, Nb: 0.50% or less, Cu: 0.30% or less, Ni: 0.05% or less, and at least one of Ca and REM: 0.0050% or less in total.

3. The steel sheet according to claim 1, further comprising a plated layer disposed on the surface.

4. The steel sheet according to claim 3, wherein the plated layer is a hot-dip galvanized layer or a hot-dip galvannealed layer.

5. The steel sheet according to claim 2, further comprising a plated layer disposed on the surface.

6. The steel sheet according to claim 5, wherein the plated layer is a hot-dip galvanized layer or a hot-dip galvannealed layer.

7. The steel sheet according to claim 1, wherein the chemical composition includes Mn: 1.3% to 2.1% by mass %.

8. A method for producing the steel sheet according to claim 1, comprising:

hot-rolling a steel material having the chemical composition under a condition in which a rolling reduction rate of a final pass of a finish rolling is 12% or more, the rolling reduction rate of a pass before the final pass is 15% or more, a finish rolling starting temperature is in a range of 1000° C. to 1150° C., and a finish rolling finishing temperature is in a range of 850° C. to 950° C.;

primary cooling the hot-rolled steel sheet obtained in the hot rolling step at a first average cooling rate of 75° C./s or more to a cooling stop temperature of 700° C. or lower;

secondary cooling the steel sheet obtained in the primary cooling step under a condition of a second average cooling rate in a range of 5° C./s to 50° C./s down to a coiling temperature of 600° C. or lower, and a coiling step of coiling the steel sheet at the coiling temperature;

pickling the hot-rolled steel sheet after the coiling step, and cold-rolling the pickled steel sheet; and annealing the cold-rolled steel sheet obtained in the cold rolling step at an average heating rate in a range of 3° C./s to 30° C./s up to a temperature in a range of 760° C. to 900° C., holding the steel sheet at a soaking temperature in the temperature range of 760° C. to 900° C. for 15 seconds or longer, and then cooling the steel sheet under a condition of an average cooling rate in a range of 3° C./s to 30° C./s down to a cooling stop temperature of 600° C. or lower.

9. The method according to claim 8, further comprising subjecting the steel sheet obtained after the cooling in the annealing step to a plating treatment.

10. The method according to claim 9, wherein the plating treatment is a treatment of hot-dip galvanizing and alloying at a temperature in a range of 450° C. to 600° C.

11. A method for producing the steel sheet according to claim 2, comprising:

hot-rolling a steel material having the chemical composition under a condition in which a rolling reduction rate of a final pass of a finish rolling is 12% or more, the rolling reduction rate of a pass before the final pass is 15% or more, a finish rolling starting temperature is in a range of 1000° C. to 1150° C., and a finish rolling finishing temperature is in a range of 850° C. to 950° C.;

primary cooling the hot-rolled steel sheet obtained in the hot rolling step at a first average cooling rate of 75° C./s or more to a cooling stop temperature of 700° C. or lower;

secondary cooling the steel sheet obtained in the primary cooling step under a condition of a second average cooling rate in a range of 5° C./s to 50° C./s down to a coiling temperature of 600° C. or lower, and a coiling step of coiling the steel sheet at the coiling temperature;

pickling the hot-rolled steel sheet after the coiling step, and cold-rolling the pickled steel sheet; and annealing the cold-rolled steel sheet obtained in the cold rolling step at an average heating rate in a range of 3° C./s to 30° C./s up to a temperature in a range of 760° C. to 900° C., holding the steel sheet at a soaking temperature in the temperature range of 760° C. to 900° C. for 15 seconds or longer, and then cooling the steel sheet under a condition of an average cooling rate in a range of 3° C./s to 30° C./s down to a cooling stop temperature of 600° C. or lower.

12. The method according to claim 11, further comprising subjecting the steel sheet obtained after the cooling step in the annealing step to a plating treatment.

13. The method according to claim 12, wherein the plating treatment is a treatment of hot-dip galvanizing and alloying at a temperature in a range of 450° C. to 600° C.

* * * * *